(No Model.)
T. B. JEFFERY.
BICYCLE.
No. 259,313. Patented June 13, 1882.
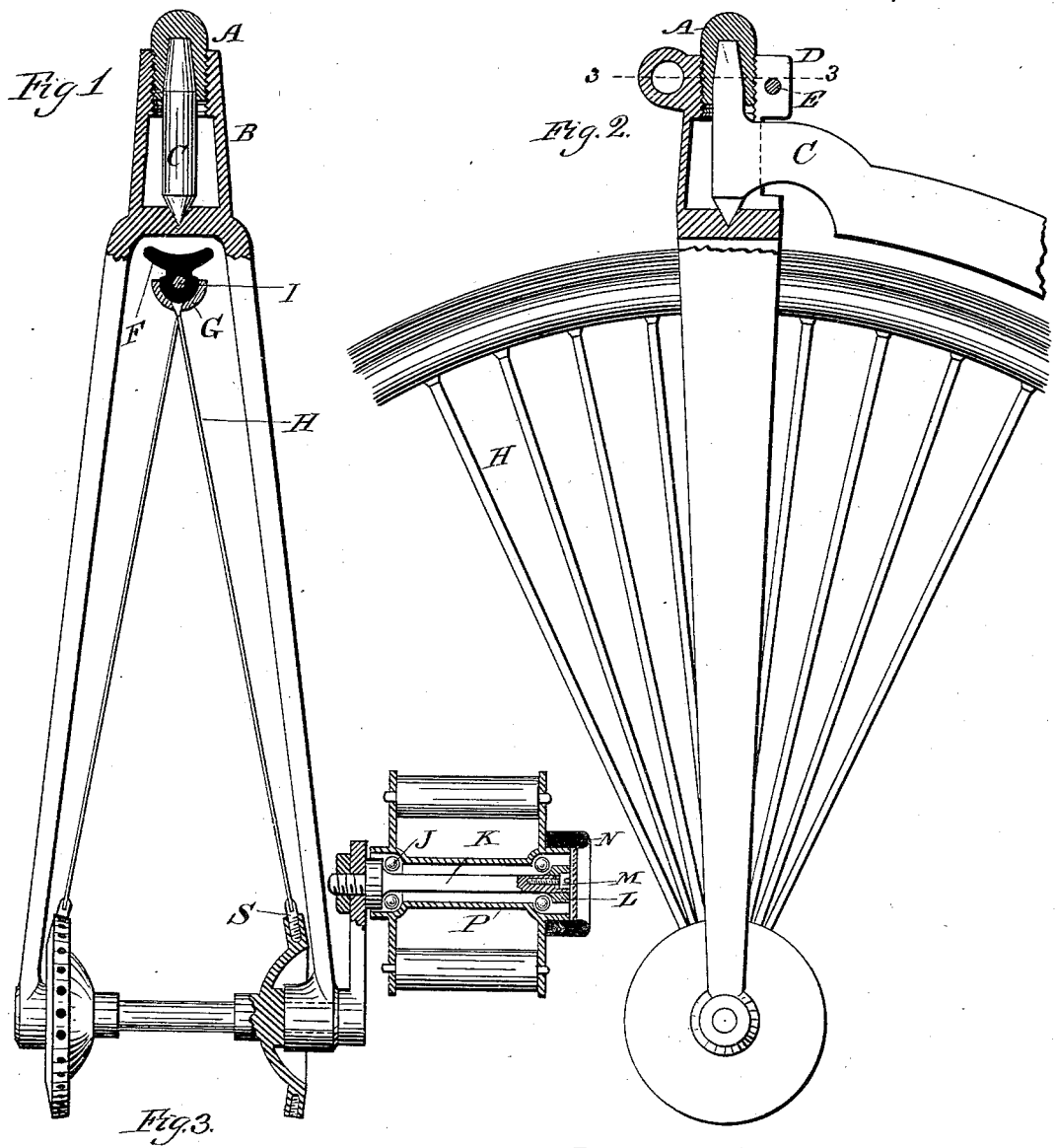
Witnesses
F. B. Townsend
Geo. B. Durkee
Inventor
Thos. B. Jeffery

UNITED STATES PATENT OFFICE.

THOMAS B. JEFFERY, OF CHICAGO, ILLINOIS.

BICYCLE.

SPECIFICATION forming part of Letters Patent No. 259,313, dated June 13, 1882.

Application filed February 17, 1882. (No model.)

*To all whom it may concern:*

Be it known that I, THOMAS B. JEFFERY, a citizen of the United States, residing at Chicago, in the county of Cook and State of Illinois, have invented a new and useful Bicycle, of which the following is a specification.

My invention relates to improvements in bicycles which have suspension-wheels and rubber tires and are propelled by the feet of the rider.

The object of my invention is to reduce friction of some of the parts, to make the machine stronger, run easier, and be better adapted for use on rough or imperfect roads. I attain these objects by improving the form of the tire, spokes, pedals, and the joint in the head or center of the fork, as illustrated in the accompanying drawings.

Figure 1 is a vertical end view, partly in section, of the front fork and propelling-wheel of a bicycle as improved; Fig. 2, a side view of part of the wheel and section of the head; Fig. 3, a horizontal section of the head at 3 3; Fig. 4, a section of the tire, enlarged; Fig. 5, an enlarged view of the outer end of pedal.

Similar letters refer to similar parts throughout the several views.

The wheel consists of an ordinary metallic felly, having a hollowed outer surface to receive a rubber tire or band. The felly is connected to a double-flanged axle, forming the hub, by light metallic spokes in the usual manner. In the felly is secured a rubber tire, F, of an improved form, having an inner portion that fits, or nearly fits, the felly. The outer portion differs from that of tires in common use by being formed as shown in section Fig. 1, in which that part of the outer portion forming the tread of the wheel, being that used in contact with the road, is depressed and hollowed longitudinally from end to end, corresponding in form to that of the felly, but of a curve having a greater radius than the latter, the object being to form a base for the wheel to roll on having a greater surface in contact with the road than that of wheels as ordinarily constructed, and to give sufficient elasticity without the employment of an unnecessary amount of rubber. The object is still further attained by hollowing also the two exposed sides which project out of the felly, the amount and depth depending or being regulated by the density of the rubber used, hard varieties requiring to be hollowed more than the softer grades.

The tire may be fastened by any of the usual modes; but the arrangement I prefer consists in employing a wire core, placed through the tire from end to end, and by a suitable appliance drawn perfectly tight when the tire is in the felly. The ends are then looped and interlocked, as shown in Fig. 4. This makes the tire perfectly secure as long as the wire core remains unbroken.

The spokes H are fastened by any of the modes usually adopted in constructing suspension-wheels, but differ in form. All suspension-wheels now made have their spokes formed of wire of circular section in every part, which I find by experiment to add materially to the power required to propel them rapidly. To obviate this I construct my spokes as shown at H in Figs. 1 and 2—that is, with enlarged ends that fit into the double flanges on the axle and apertures in the felly, and are flattened on the sides, the edges being presented to the line in which the wheel rotates—in other words, having their flattened sides outward.

In the construction of the pedals I use the ordinary pedal-blocks to receive the feet attached to two side bars which are joined to the sleeve or case P, this case being hollow to receive the spindle K, and having recessed ends, of form similar to that shown, adapted to receive and bear on the sides of a series of balls, J, that roll on the spindle at both ends, the outer one being made adjustable by means of a ring or sleeve, L, that confines and presses on the outer sides of the series of balls. This pressure keeps the case in contact with the inner series of balls, which latter are further kept in place by a flange on the inner end of the spindle or crank-pin.

In making the adjustment before mentioned on the outer end of the spindle I use the sleeve L, whose outer face is countersunk to receive part of the cylindrical head of the screw M, which screw is fitted in the end of the spindle and as near the sleeve as it can be conveniently done. The material of the spindle end is removed in such a manner that the head of the screw will not bear on it, but on the sleeve, which can therefore, by turning the screw to the right or left, change the position of the sleeve on the spindle relatively to the inner flange and form an adjusting device, the screw-head also performing the purpose of a key to prevent the sleeve turning on the spindle.

The interior of the case is protected from dust by a suitable cap on the outer end; and to protect the pedal from injury in the event of the machine falling on it I attach to the outer side or end of the case a rubber cushion, N, for convenience and lightness made in an annular form; but other convenient forms may be as effective and substituted with the same object.

To make the machine more rigid I dispense with the ordinary jamb-nut used to secure the center screw or bushing, A, and split or divide the cavity for the bushing, providing lugs D at each side of the division, and means for closing them, as by the screw E, thus clamping more securely the bushing, the latter being provided with screw-threads for ease of adjustment, or otherwise, the division in the cavity being further utilized to admit a longer neck, C, than could be inserted without such division.

I am aware that prior to my invention rubber tires have been made of circular outline, having longitudinal grooves extending around the wheel, and that spokes are commonly used in machinery having flattened sides and their edges presented to the direction in which the wheel may revolve. I therefore do not claim such combinations, broadly.

I claim as my invention—

1. In a metallic felly having a hollowed outer surface, a rubber tire having a corresponding hollowed outer surface of greater curvature, substantially as and for the purpose described.

2. The rubber tire, as described, having a hollowed face or tread, a single groove on each side, and a base adapted to fit a hollowed felly, substantially as and for the purpose described.

3. In a metallic suspension-wheel for vehicles, the improved spoke, consisting of a metallic wire, of circular section, enlarged at one end to form a head and having on the other screw-threads formed, the intervening portion being compressed or flattened, and adjusted in the wheel in such a way as to present the edge of the spoke to the direction in which the wheel will roll, substantially as and for the purpose described.

4. An annular rubber cushion attached to the pedal-case and surrounding the end of the pedal-pin, but removed from it, constructed and arranged substantially as and for the purpose described.

5. In combination with a series of balls, ball-case, foot-blocks, and pedal-spindle, the adjustable sleeve L and screw M, substantially as and for the purpose described.

6. The head containing the central pivot of a bicycle, formed with a vertical division extending through the portion holding the bushing, in combination with a clamping device that compresses the divided sides and the bushing, substantially as described.

THOMAS B. JEFFERY.

Witnesses:
ALBIN K. DOE,
GEO. B. DURKEE.